US012057096B2

(12) United States Patent
Li et al.

(10) Patent No.: US 12,057,096 B2
(45) Date of Patent: Aug. 6, 2024

(54) VIRTUAL DRUM KIT DEVICE

(71) Applicant: SHENZHEN CIRCLE-DOTS EDUCATION CO., LTD., Shenzhen (CN)

(72) Inventors: Ning Li, Shenzhen (CN); Ming Yan, Shenzhen (CN); Yong Zhang, Shenzhen (CN)

(73) Assignee: SHENZHEN CIRCLE-DOTS EDUCATION CO., LTD, Shenzhen (CN)

( * ) Notice: Subject to any disclaimer, the term of this patent is extended or adjusted under 35 U.S.C. 154(b) by 562 days.

(21) Appl. No.: 17/340,150

(22) Filed: Jun. 7, 2021

(65) Prior Publication Data

US 2022/0392424 A1 Dec. 8, 2022

(51) Int. Cl.

| | |
|---|---|
| ***G10H 1/00*** | (2006.01) |
| ***G10D 13/03*** | (2020.01) |
| ***G10D 13/11*** | (2020.01) |
| ***G10D 13/12*** | (2020.01) |

(52) U.S. Cl.

CPC ........... *G10H 1/0008* (2013.01); *G10D 13/03* (2020.02); *G10D 13/11* (2020.02); *G10D 13/12* (2020.02); *G10H 1/0066* (2013.01); *G10H 1/0083* (2013.01); *G10H 2220/391* (2013.01); *G10H 2220/395* (2013.01); *G10H 2220/401* (2013.01); *G10H 2230/281* (2013.01)

(58) Field of Classification Search

CPC ............... G10H 1/0008; G10H 1/0066; G10H 1/0083; G10H 2220/391; G10H 2220/395; G10H 2220/401; G10H 2230/281; G10D 13/03; G10D 13/12; G10D 13/11

See application file for complete search history.

(56) References Cited

U.S. PATENT DOCUMENTS

| | | | | |
|---|---|---|---|---|
| 7,282,633 | B1 * | 10/2007 | Coolidge ............... | G10H 3/143 84/723 |
| 7,343,777 | B2 * | 3/2008 | Cordani ................... | G10H 3/12 73/12.01 |
| 8,198,526 | B2 * | 6/2012 | Izen ....................... | G10H 3/146 84/743 |
| 10,867,590 | B1 * | 12/2020 | Miller .................. | G10H 1/0008 |
| 10,991,352 | B2 * | 4/2021 | Piccionelli ........... | G10H 1/0083 |
| 2016/0203807 | A1 * | 7/2016 | Hardi .................. | G10H 1/0033 84/600 |

* cited by examiner

*Primary Examiner* — Jianchun Qin

(74) *Attorney, Agent, or Firm* — Grogan, Tuccillo & Vanderleeden LLP

(57) ABSTRACT

The present disclosure relates to a virtual drum kit device. The virtual drum kit device includes a motion capture device and a drum sound processing device separated from each other; where, the motion capture device includes at least two drumsticks, the drumstick including a first cover body, as well as a first battery, a first control printed circuit board assembly (PCBA) board and a vibration motor which are arranged in the first cover body, the first control PCBA board being connected to the battery and the vibration motor separately, and being capable of transmitting an RF signal to the drum sound processing device according to a motion instruction captured by the drumstick, the drum sound processing device includes a second cover body, as well as a second battery and a second control PCBA board which are arranged in the second cover body.

9 Claims, 7 Drawing Sheets

VIRTUAL DRUM KIT DEVICE

TECHNICAL FIELD

The disclosure relates to the technical field of drum kits, and in particular to a virtual drum kit device.

BACKGROUND ART

Currently, as a common musical instrument, a drum kit can hardly be accessible by a beginner and an interested consumer due to its large size, carrying inconvenience, high price, etc. Although devices such as an “electronic drum” and an “air drum” have been available in the market, they still have the following disadvantages:

1. For the “electronic drum”, a physical drumhead is still reserved, and although the size is reduced, it still needs power connection, occupies large space, and is difficult to carry. Therefore, the user experience is still not improved, and the “electronic drum” is still unfriendly to the beginner and consumer; and 2. For the “air drum”, a motion capture device is used to assign motion data to an intelligent device for processing. Although a physical drumhead is not needed, the “air drum” functions well only with the help of necessary smart devices (such as a mobile phone, a tablet computer and a computer) with corresponding software. In this regard, the “air drum” cannot be called an independent device. Moreover, owing to limit of the performance of the intelligent device, different degrees of delays may be generated, which result in adverse experience, so the “air drum” cannot be used for practice and performance.

SUMMARY

In order to overcome the above-mentioned disadvantages in the prior art, the present disclosure provides a virtual drum kit device, to solve the problems set forth in the above-mentioned background art.

A technical solution used by the present disclosure to solve the problems in the prior art is: a virtual drum kit device includes a motion capture device and a drum sound processing device separated from each other; where, the motion capture device includes at least two drumsticks, the drumstick including a first cover body, as well as a first battery, a first control printed circuit board assembly (PCBA) board and a vibration motor which are arranged in the first cover body, the first control PCBA board being connected to the battery and the vibration motor separately, and being capable of transmitting a radio frequency (RF) signal to the drum sound processing device according to a motion instruction captured by the drumstick, and the drum sound processing device includes a second cover body, as well as a second battery and a second control PCBA board which are arranged in the second cover body, the second control PCBA board being electrically connected to the second battery, the second control PCBA board being used for receiving the RF signal transmitted by the first control PCBA board, in addition, the second PCBA board being provided with an audio output, and the audio output being used for being connected to an earphone or a sound box. In addition, a second micro control unit (MCU) controls the Bluetooth chip to provide a Bluetooth low energy musical instrument digital interface (BLE MIDI) and a universal serial bus musical instrument digital interface (USB MIDI), and transmits, through the BLE and USB interfaces, an MIDI encoded instruction of a drum kit to an external device capable of receiving the MIDI instruction.

As a preferred solution of the present disclosure, the first control PCBA board includes a first MCU, a first gyroscope sensor, a first accelerometer, a geomagnetic sensor and a first 2.4 G RF chip, the first gyroscope sensor, the first accelerometer, the geomagnetic sensor and the first 2.4 G RF chip being connected with the first MCU separately, and the first 2.4 G RF chip being used for transmitting an RF signal to the second control PCBA board.

As a preferred solution of the present disclosure, the first control PCBA board further includes a first state indicator lamp, a first function key and a first charging circuit, the first state indicator lamp, the first function key and the first charging circuit being connected with the first MCU separately, and the first charging circuit charging the first battery through the first MCU.

As a preferred solution of the present disclosure, the second control PCBA board includes a second MCU, a Bluetooth chip and a second 2.4 G RF chip, the Bluetooth chip and the second 2.4 G RF chip being connected with the second MCU separately, the second 2.4 G RF chip being used for receiving the RF signal transmitted by the first control PCBA, the Bluetooth chip being used for receiving a music sound effect of an external sound source, and in addition, the second MCU controlling the Bluetooth chip to provide BLE MIDI and USB MIDI, and transmitting, through the BLE and USB interfaces, an MIDI encoded instruction of a drum kit to an external device capable of receiving the MIDI instruction.

As a preferred solution of the present disclosure, the second control PCBA board further includes a second state indicator lamp, a second function key and a second charging circuit, the second state indicator lamp and the second function key being connected with the second MCU separately, and the second charging circuit charging the second battery through the second MCU.

As a preferred solution of the present disclosure, the motion capture device may further include a pedal, the pedal including a third MCU, a third battery, a second gyroscope sensor, a second accelerometer and a third 2.4 G RF chip, the third battery, the second gyroscope sensor, the second accelerometer and the third 2.4 G RF chip being connected with the third MCU separately, and the third 2.4 G RF chip being used for transmitting an RF signal to the second control PCBA board.

As a preferred solution of the present disclosure, the pedal further includes a third state indicator lamp, a third function key and a third charging circuit, the third state indicator lamp, the third function key and the third charging circuit being connected with the third MCU separately, and the third charging circuit charging the third battery through the third MCU.

As a preferred solution of the present disclosure, the drum sound processing device further includes back clips, the back clips being movably arranged on the second and third cover bodies through elastic members.

Compared with the prior art, the present disclosure has the following technical effects:

1. the virtual drum kit device of the present disclosure can simulate a drum kit through the motion capture device and the drum sound processing device separated from each other, and can be carried around and performed at any time, thereby greatly improving portability of the drum kit;

2. an additional intelligent device (such as a computer, a tablet computer and a mobile phone) is not required, and use is convenient;

3. the drum sound processing device can be connected to a player (such as an earphone) through the audio output, so as not to disturb others, and the device is suitable for solo practice;

4. the motion capture device and the drum sound processing device are connected based on a 2.4 GHZ wireless protocol, so that code matching is not needed, a connection will not fail, and a percussion action and a sound output are not delayed;

5. the BLE MIDI and USB MIDI are provided to transmit, through the BLE and USB interfaces, the MIDI encoded instruction of the drum kit to the external device capable of receiving the MIDI instruction; and 6. the drum sound processing device can receive Bluetooth music transmitted by the intelligent device and mix the same with a drum sound to output.

REFERENCE NUMERALS IN THE FIGURES

1. drumstick, 11. first cover body, 12. first battery, 13. first control PCBA board, 14. vibration motor, 131. first micro control unit (MCU), 132. first gyroscope sensor, 133. first accelerometer, 134. geomagnetic sensor, 135. first 2.4 G radio frequency (RF) chip, 136. first state indicator lamp, 137. first function key, and 138. first charging circuit;

2. drum sound processing device, 21. second cover body, 22. second battery, 23. second control PCBA board, 24. back clip, 25. bolt, 26. spring, 231. audio output, 232. second MCU, 233. Bluetooth chip, 234. second 2.4 G RF chip, 235. second state indicator lamp, 236. second function key, 237. second charging circuit, 238. Bluetooth low energy musical instrument digital interface (BLE MIDI), and 239. universal serial bus musical instrument digital interface (USB MIDI); and

3. pedal, 31. third cover body, 331. third MCU, 32. third battery, 38. third control PCBA board, 333. second gyroscope sensor, 334. second accelerometer, 335. third 2.4 G RF chip, 336. third state indicator lamp, 37. third function key, 338. third charging circuit, 36. spring, 34. back clip, and 25. bolt.

DETAILED DESCRIPTION OF THE EMBODIMENTS

The specific implementations of the present disclosure will be further described below with reference to the accompanying drawings, and it should be noted that the descriptions of these implementations are intended to assist in understanding the present disclosure, instead of limiting the present disclosure.

Further, the technical features involved in the implementation of the present disclosure described below may be combined with one another as long as they do not constitute a conflict with one another.

Figure 1:
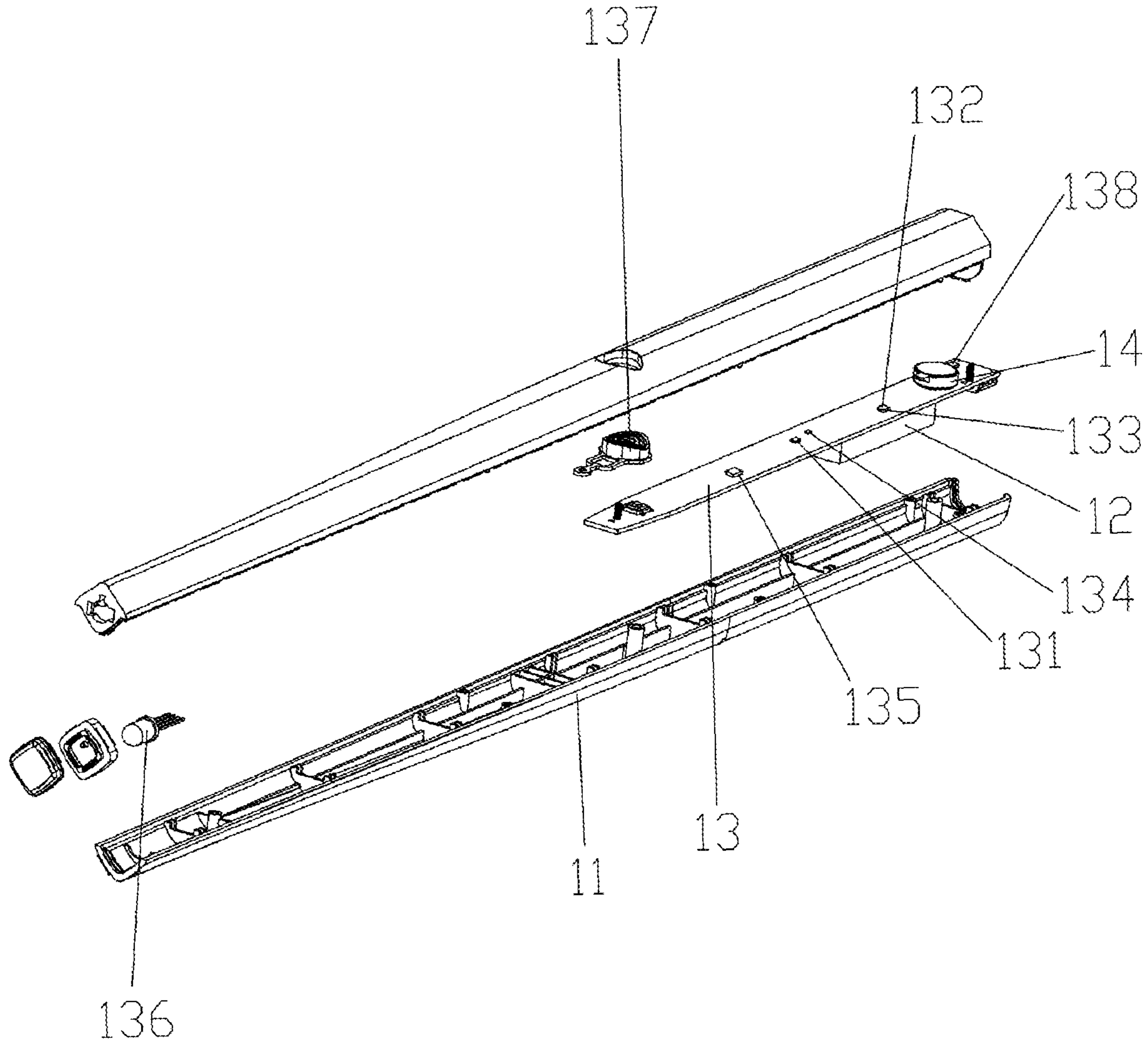
FIG. 1 is a structural diagram of a drumstick in a virtual drum kit device of the present disclosure.
Figure 2:
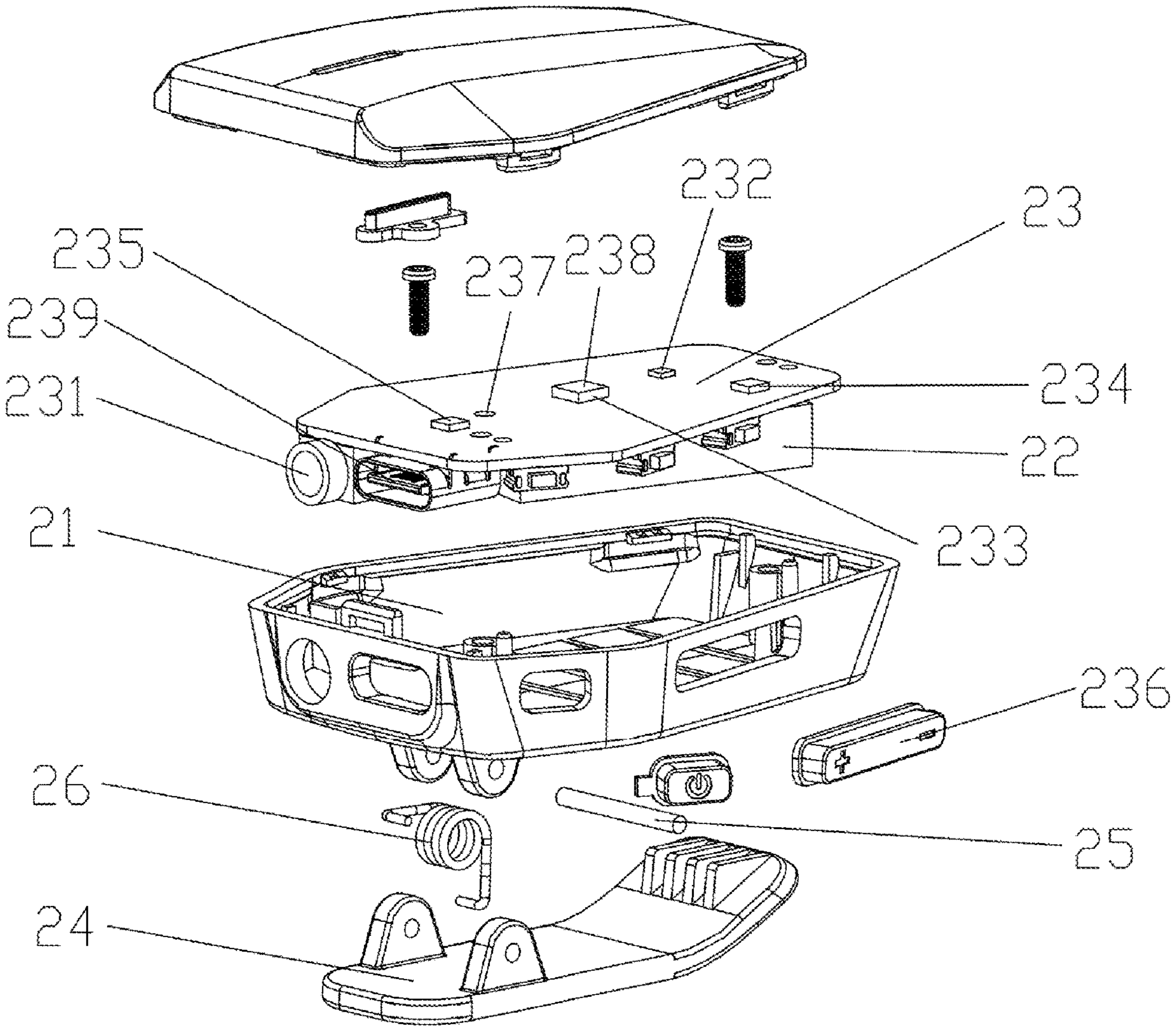
FIG. 2 is a structural diagram of a drum sound processing device in the virtual drum kit device of the present disclosure.
Figure 3:
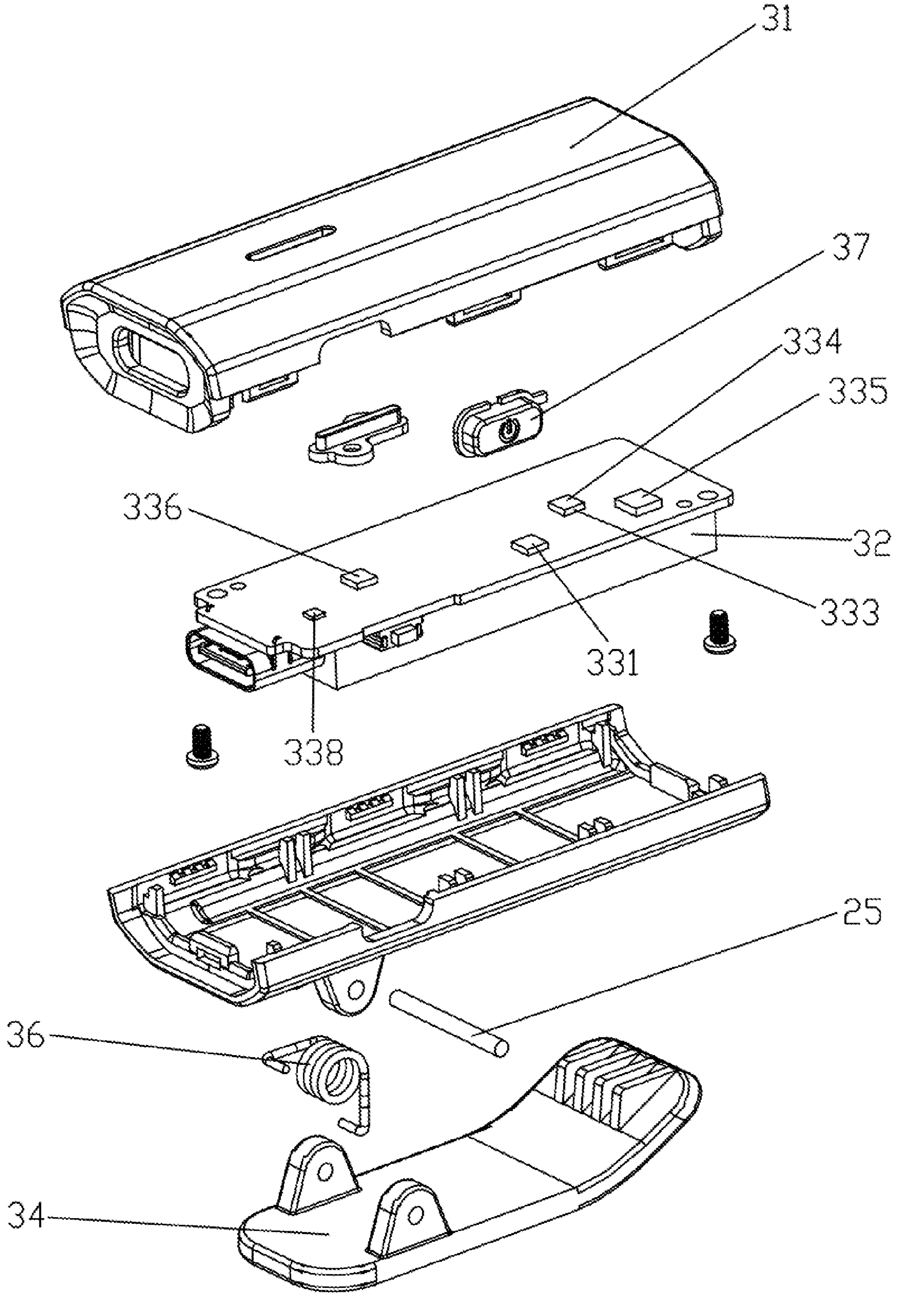
FIG. 3 is a structural diagram of a pedal in the virtual drum kit device of the present disclosure.
Figure 4:
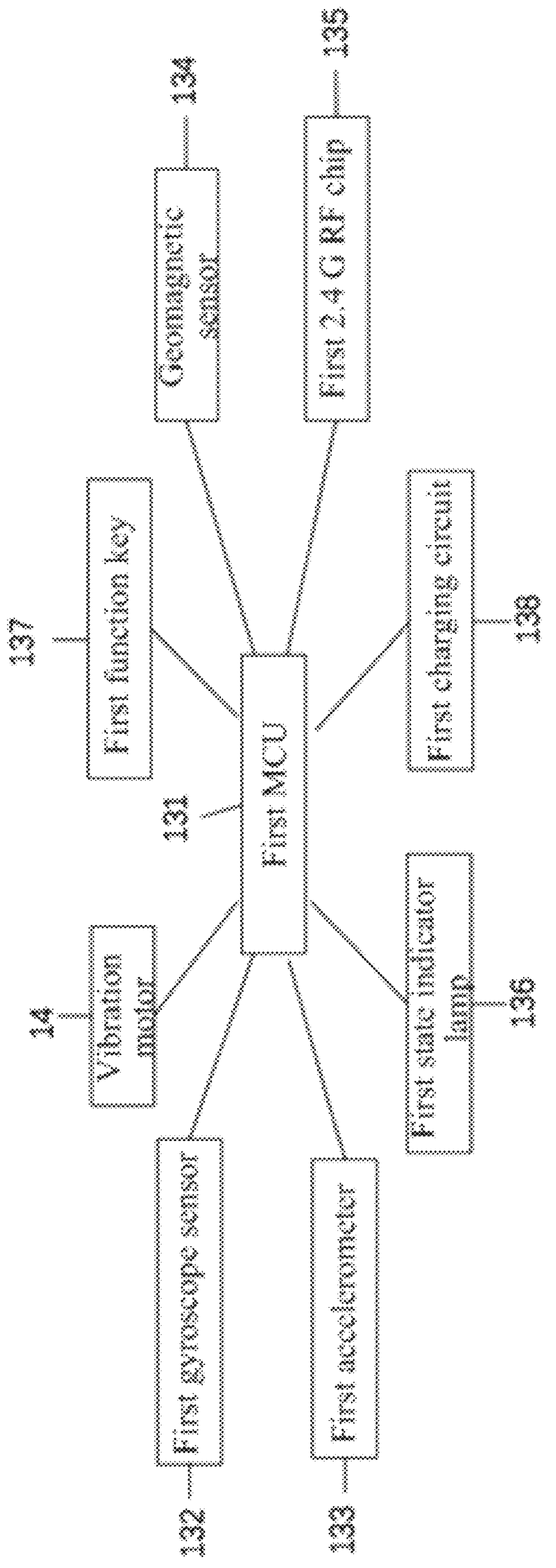
FIG. 4 is a functional block diagram of a first control printed circuit board assembly (PCBA) board in the virtual drum kit device of the present disclosure.
Figure 5:
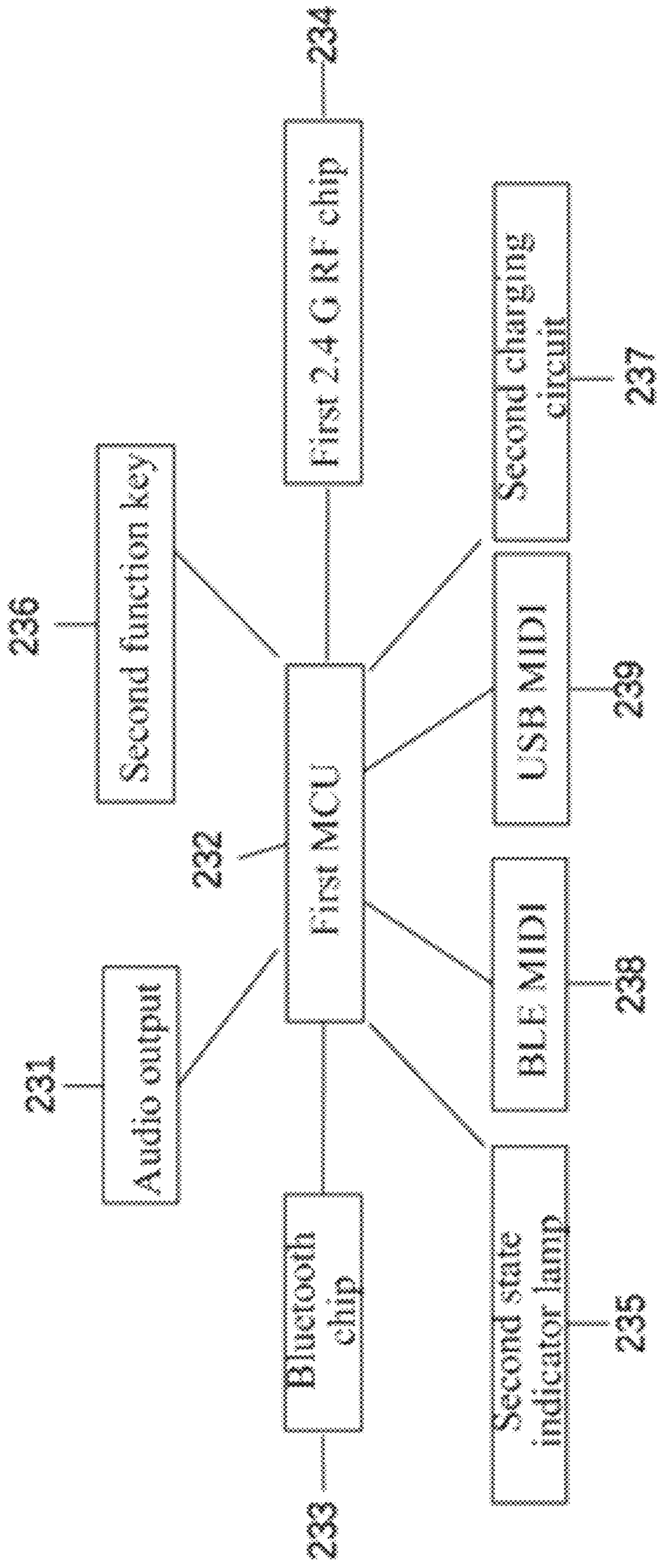
FIG. 5 is a functional block diagram of a second control PCBA board in the virtual drum kit device of the present disclosure.
Figure 6:
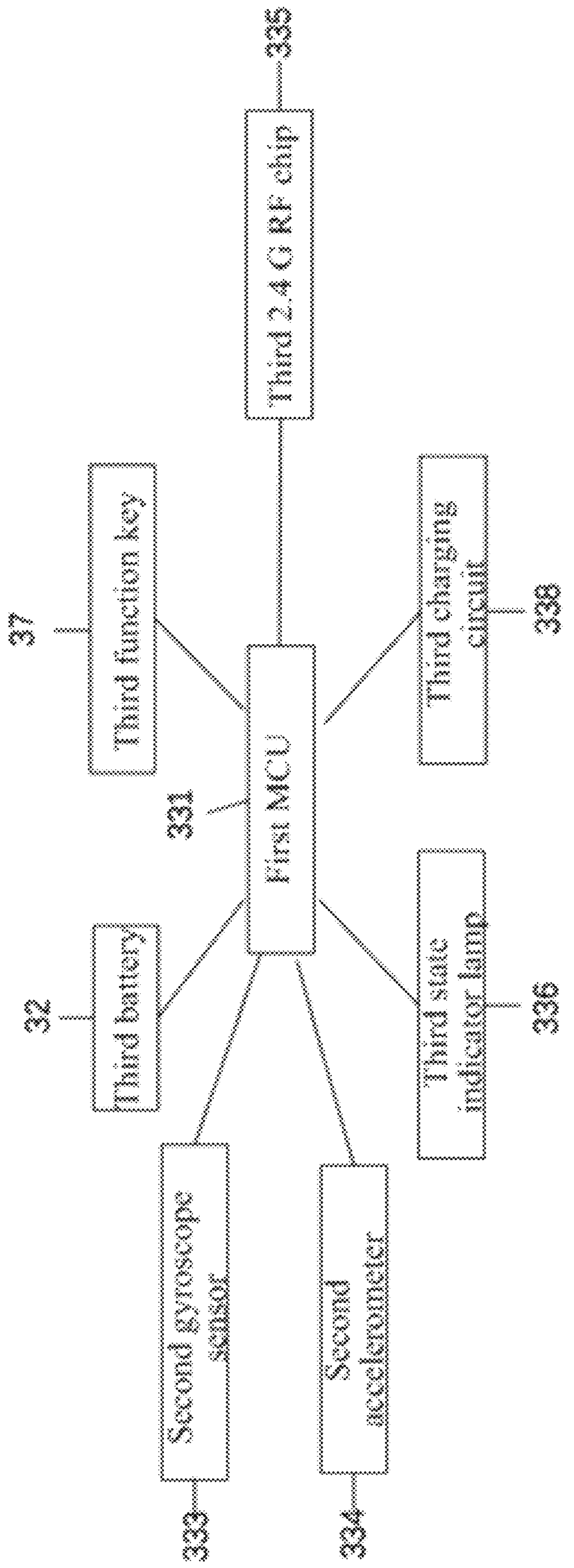
FIG. 6 is a functional block diagram of a third control PCBA board in the virtual drum kit device of the present disclosure.
Figure 7:
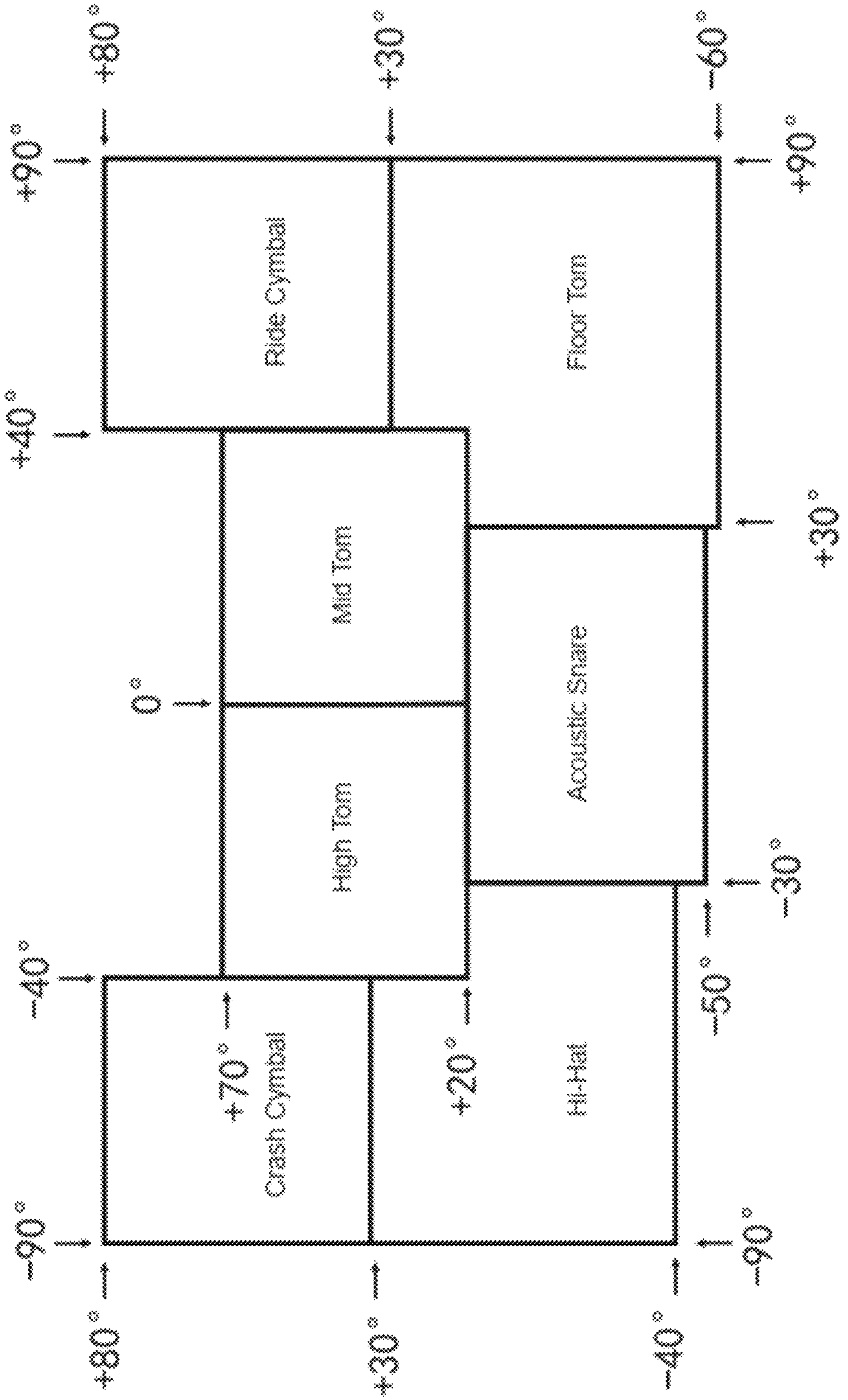
FIG. 7 is a schematic diagram of a spacial drumhead in the virtual drum kit device of the present disclosure.

As shown in FIGS. 1-7, a virtual drum kit device includes a motion capture device and a drum sound processing device 2 separated from each other; where, the motion capture device includes at least two drumsticks 1, the drumstick 1 including a first cover body 11, as well as a first battery 12, a first control printed circuit board assembly (PCBA) board 13 and a vibration motor 14 which are arranged in the first cover body 11, the first control PCBA board 13 being connected to the battery and the vibration motor 14 separately, and being capable of transmitting a radio frequency (RF) signal to the drum sound processing device 2, and the drum sound processing device 2 includes a second cover body 21, as well as a second battery 22 and a second control PCBA board 23 which are arranged in the second cover body 21, the second control PCBA board 23 being electrically connected to the second battery 22, the second control PCBA board 23 being used for receiving the RF signal transmitted by the first control PCBA board 13, in addition, the second PCBA board being provided with an audio output 231, and the audio output 231 being used for being connected to an earphone or a sound box.

Further, the motion capture device may further include a pedal 3, the pedal 3 including a third micro control unit (MCU) 331, a third battery 32, a second gyroscope sensor 333, a second accelerometer 334 and a third 2.4 G RF chip 335, the third battery 32, the second gyroscope sensor 333, the second accelerometer 334 and the third 2.4 G RF chip 335 being connected with the third MCU 331 separately, and the third 2.4 G RF chip 335 being used for transmitting an RF signal to the second control PCBA board 23.

Preferably, the first control PCBA board 13 includes a first MCU 131, a first gyroscope sensor 132, a first accelerometer 133, a geomagnetic sensor 134 and a first 2.4 G RF chip 135, the first gyroscope sensor 132, the first accelerometer, the geomagnetic sensor 134 and the first 2.4 G RF chip 135 being connected with the first MCU 131 separately, and the first 2.4 G RF chip 135 being used for transmitting an RF signal to the second control PCBA board 23.

Further, the first control PCBA board 13 further includes a first state indicator lamp 136, a first function key 137 and a first charging circuit 138, the first state indicator lamp 136, the first function key 137 and the first charging circuit 138 being connected with the first MCU 131 separately, and the first charging circuit 138 charging the first battery 12 through the first MCU 131.

Preferably, the second control PCBA board 23 includes a second MCU 232, a Bluetooth chip 233 and a second 2.4 G RF chip 234, the Bluetooth chip 233 and the second 2.4 G RF chip 234 being connected with the second MCU 232 separately, the second 2.4 G RF chip 234 being used for receiving the RF signal transmitted by the first control PCBA, and the Bluetooth chip 233 being used for receiving a music sound effect of an external sound source, and transmitting, through a Bluetooth low energy musical instrument digital interface (BLE MIDI) 238 and a universal serial bus musical instrument digital interface (USB MIDI) 239, an MIDI encoded instruction of a drum kit to an external device capable of receiving the MIDI instruction.

Further, the second control PCBA board 23 further includes a second state indicator lamp 235, a second function key 236 and a second charging circuit 237, the second state indicator lamp 235 and the second function key 236 being connected with the second MCU 232 separately, and the second charging circuit 237 charging the second battery 22 through the second MCU 232.

Preferably, the pedal 3 further includes a third state indicator lamp 336, a third function key 37 and a third charging circuit 338, the third state indicator lamp 336, the third function key 37 and the third charging circuit 338 being connected with the third MCU 331 separately, and the third charging circuit 338 charging the third battery 32 through the third MCU 331.

Particularly, when in use, a user holds one drumstick 1 in each hand, the pedals 3 can be clamped (tied) on shoes or shoelaces of a left foot and a right foot separately, the drumstick 1 is used for percussing a specific position in a space (see FIG. 8), and a corresponding pedal 3 is vibrated with the foot.

The drumstick 1 determines movement data of the hand of the user by capturing a position posture (position) and a speed posture (percussion) through a sensor group consisting of the first gyroscope sensor 132, the first accelerometer 133 and the geomagnetic sensor 134, and transmits the movement data to the second 2.4 G RF chip 234 in the drum sound processing device 2 through the first 2.4 G RF chip 135.

The pedal 3 captures vibration information or the position posture to determine movement data of the foot of the user through the third MCU 331, the second gyroscope sensor 333, and the second accelerometer 334, and transmits the movement data to the second 2.4 G RF chip 234 in the drum sound processing device 2 through the third 2.4 G RF chip 335.

After receiving the RF signal, the drum sound processing device 2 performs operation processing on the signal through the second MCU 232, plays audio data corresponding to a percussion code, and is connected to the earphone or a speaker through the audio output 231 to output a musical instrument sound.

In addition, the Bluetooth chip 233 is further arranged in the drum sound processing device 2, the Bluetooth chip 233 being used for receiving the music sound effect of the external sound source to match a percussion sound of the user, and transmitting, through the BLE and USB interfaces, the MIDI encoded instruction of the drum kit to the external device capable of receiving the MIDI instruction.

Further, the drum sound processing device 2 further includes a back clip 24, the back clip 24 being movably arranged on the second cover body 21 through an elastic member, so the user can carry the drum sound processing device 2 conveniently.

Particularly, the elastic member includes a bolt 25 and a spring 26, the back clip 24 is movably arranged on the second cover body 21 through the bolt 25, the spring 26 being arranged on the bolt 25 in a sleeving mode.

Finally, it should be noted that the above descriptions are merely the preferred embodiments of the present disclosure and are not intended to limit the present disclosure. Although the present disclosure is described in detail with reference to the foregoing embodiments, a person skilled in the art can still make modifications to the technical solutions described in various foregoing examples, or make equivalent replacement to a part of its technical features. Any modifications, equivalent replacements, improvements, etc. made within the spirit and principle of the present invention patent shall all fall under the scope of protection of the present invention patent.

What is claimed is:

1. A virtual drum kit device, comprising a motion capture device and a drum sound processing device which are arranged in a separated mode; wherein the motion capture device comprises at least two drumsticks, each drumstick comprising a first sensor group, a first cover body, as well as a first battery, a first control printed circuit board assembly (PCBA) board and a vibration motor which are arranged in the first cover body, and the first control PCBA board being connected to the battery and the vibration motor separately, wherein the first sensor group is configured to capture a hand position posture and a hand speed posture of a user to determine a first movement data, and the first control PCBA board is configured to generate a first motion instruction based on the first movement data, and then transmit a first radio frequency (RF) signal based on the first motion instruction to the drum sound processing device, and the motion capture device further comprises two pedals, each pedal comprising a second sensor group, a third cover body, as well as a third battery and a third control PCBA board which are arranged in the third cover body, the third control PCBA board being connected to the battery, wherein the second sensor group is configured to capture a foot vibration information and a foot position posture of the user to determine a second movement data, and the third control PCBA board is configured to generate a second motion instruction based on the second movement data, and then transmit a second RF signal based on the second motion instruction to the drum sound processing device; and the drum sound processing device comprises a second cover body, as well as a second battery and a second control PCBA board which are arranged in the second cover body, the second control PCBA board being electrically connected to the second battery, wherein the second control PCBA board is configured to receive and process the first RF signal and the second RF signal to generate percussion code; and the drum sound processing device receives a Bluetooth audio signal transmitted by another intelligent device, and wherein the second PCBA board is provided with an audio output, and the audio output being used for being connected to an earphone or a sound box for playing audio data corresponding to the percussion code and the Bluetooth audio signal that matches the audio data; and wherein the second PCBA board is further configured to generate a standard musical instrument digital interface (MIDI) encoded instruction based on the first RF signal and the second RF signal, and transmit, through Bluetooth low energy (BLE) or universal serial bus (USB), the MIDI encoded instruction to an external device capable of receiving an MIDI instruction.

2. The virtual drum kit device according to claim 1, wherein the first control PCBA board comprises a first micro control unit (MCU), the first sensor group comprising a first gyroscope sensor, a first accelerometer and a geomagnetic sensor, and a first 2.4 G RF chip; the first gyroscope sensor, the first accelerometer, the geomagnetic sensor and the first 2.4 G RF chip being connected with the first MCU separately, and the first 2.4 G RF chip being used for transmitting the first RF signal to the second control PCBA board.

3. The virtual drum kit device according to claim 2, wherein the first control PCBA board further comprises a first state indicator lamp, a first function key and a first charging circuit, the first state indicator lamp, the first function key and the first charging circuit being connected with the first MCU separately, and the first charging circuit charging the first battery through the first MCU.

4. The virtual drum kit device according to claim 1, wherein the second control PCBA board comprises a second MCU, a Bluetooth chip and a second 2.4 G RF chip, the Bluetooth chip and the second 2.4 G RF chip being connected with the second MCU separately, the second 2.4 G RF chip being used for receiving the first RF signal and the second RF signal, the Bluetooth chip being used for receiving a music sound effect of an external sound source, and the second MCU controlling the Bluetooth chip to provide BLE MIDI and USB MIDI, and transmitting, through the BLE and USB interfaces, the MIDI encoded instruction of a drum kit to the external device capable of receiving the MIDI instruction.

5. The virtual drum kit device according to claim 4, wherein the second control PCBA board further comprises a second state indicator lamp, a second function key and a second charging circuit, the second state indicator lamp and the second function key being connected with the second MCU separately, and the second charging circuit charging the second battery through the second MCU.

6. The virtual drum kit device according to claim 1, wherein the third control PCBA board comprising comprises a third MCU, a third battery, the second sensor group comprising a second gyroscope sensor and a second accelerometer, and a third 2.4 G RF chip; the third battery, the second gyroscope sensor, the second accelerometer and the third 2.4 G RF chip being connected with the third MCU separately, and the third 2.4 G RF chip being used for transmitting the second RF signal to the second control PCBA board.

7. The virtual drum kit device according to claim 6, wherein the third control PCBA board further comprises a third state indicator lamp, a third function key and a third charging circuit; the third state indicator lamp, the third function key and the third charging circuit being connected with the third MCU separately, and the third charging circuit charging the third battery through the third MCU.

8. The virtual drum kit device according to claim 1, wherein the drum sound processing device further comprises a back clip, the back clip being movably arranged on the second cover body through an elastic member.

9. The virtual drum kit device according to claim 1, wherein the pedal device further comprises a back clip, the back clip being movably arranged on the third cover body through an elastic member.

* * * * *